(12) United States Patent
Bauer et al.

(10) Patent No.: US 9,371,772 B2
(45) Date of Patent: Jun. 21, 2016

(54) SUPERCHARGED INTERNAL COMBUSTION ENGINE

(75) Inventors: Swen-Juri Bauer, Stuttgart (DE);
Andreas Gruener, Hattenhofen (DE);
Martin Janssen, Stuttgart (DE);
Hans-Peter Klein, Leutenbach (DE);
Mandy Noack, Redlingen (DE); Joerg Rueckauf, Schwieberdingen (DE);
Bernd Van Eickels, Esslingen (DE);
Eike Willers, Stuttgart (DE)

(73) Assignees: Mahle International GmbH (DE);
Behr Thermot-Tronik GmbH (DE)

( * ) Notice: Subject to any disclaimer, the term of this patent is extended or adjusted under 35 U.S.C. 154(b) by 0 days.

(21) Appl. No.: 14/235,791

(22) PCT Filed: Jul. 26, 2012

(86) PCT No.: PCT/EP2012/064703
§ 371 (c)(1),
(2), (4) Date: Jun. 9, 2014

(87) PCT Pub. No.: WO2013/017524
PCT Pub. Date: Feb. 7, 2013

(65) Prior Publication Data
US 2014/0283796 A1 Sep. 25, 2014

(30) Foreign Application Priority Data

Jul. 29, 2011 (DE) .......................... 10 2011 080 101
Aug. 15, 2011 (DE) .......................... 10 2011 080 965

(51) Int. Cl.
*F02B 33/44* (2006.01)
*F02B 37/00* (2006.01)
*F02M 25/07* (2006.01)

(52) U.S. Cl.
CPC ............ *F02B 37/00* (2013.01); *F02M 25/0709* (2013.01); *F02M 25/0719* (2013.01); *F02M 25/0796* (2013.01); *F02M 25/0724* (2013.01); *Y02T 10/121* (2013.01)

(58) Field of Classification Search
None
See application file for complete search history.

(56) References Cited

U.S. PATENT DOCUMENTS 4,513,571 A 4/1985 Jenny et al.
5,822,958 A * 10/1998 Davis ..................... B65B 39/00
137/240

(Continued)

FOREIGN PATENT DOCUMENTS

DE 10222917 A1 12/2003
DE 102008005400 A1 7/2008

(Continued)

OTHER PUBLICATIONS

English abstract for DE-102011016630.

(Continued)

*Primary Examiner* — Jesse Bogue
(74) *Attorney, Agent, or Firm* — Fishman Stewart PLLC

(57) ABSTRACT

A supercharged internal combustion engine may include an exhaust gas turbocharger which is integrated into an exhaust section on the turbine side and into an intake section on the compressor side. An exhaust gas recirculation line may connect the exhaust section and the intake section. The exhaust gas recirculation line may branch off from the exhaust section downstream of a turbine of the exhaust gas turbocharger and opens into the intake section upstream of a compressor. A valve device for performing at least one of open-loop and closed-loop control of an exhaust gas recirculation rate may be arranged in the region of the exhaust gas recirculation line.

11 Claims, 4 Drawing Sheets

(56) References Cited

U.S. PATENT DOCUMENTS

| | | | |
|---|---|---|---|
| 6,006,732 A * | 12/1999 | Oleksiewicz | F02B 75/22 123/568.11 |
| 6,220,233 B1 * | 4/2001 | Pierpont | F02M 25/0707 123/568.12 |
| 6,422,217 B1 * | 7/2002 | Feucht | F02M 25/0707 123/568.11 |
| 7,617,678 B2 * | 11/2009 | Joergl | F02M 25/0709 123/568.12 |
| 2006/0272625 A1 * | 12/2006 | Wang | F02B 29/0406 123/568.16 |
| 2009/0090492 A1 | 4/2009 | Ablitzer et al. | |
| 2011/0132337 A1 | 6/2011 | Lupescu et al. | |
| 2013/0025576 A1 * | 1/2013 | Busato | F02M 25/0786 123/568.11 |

FOREIGN PATENT DOCUMENTS

| | | |
|---|---|---|
| DE | 102011016630 A1 | 10/2012 |
| EP | 0075360 A1 | 3/1983 |
| EP | 2048416 A2 | 4/2009 |
| JP | H06108923 A | 4/1994 |
| WO | WO-2008/024609 A1 | 2/2008 |
| WO | WO-2010/034450 A1 | 4/2010 |
| WO | WO-2011/048540 A1 | 4/2011 |

OTHER PUBLICATIONS

English abstract for DE-102008005400.

English Abstract for JP H06108923.

* cited by examiner

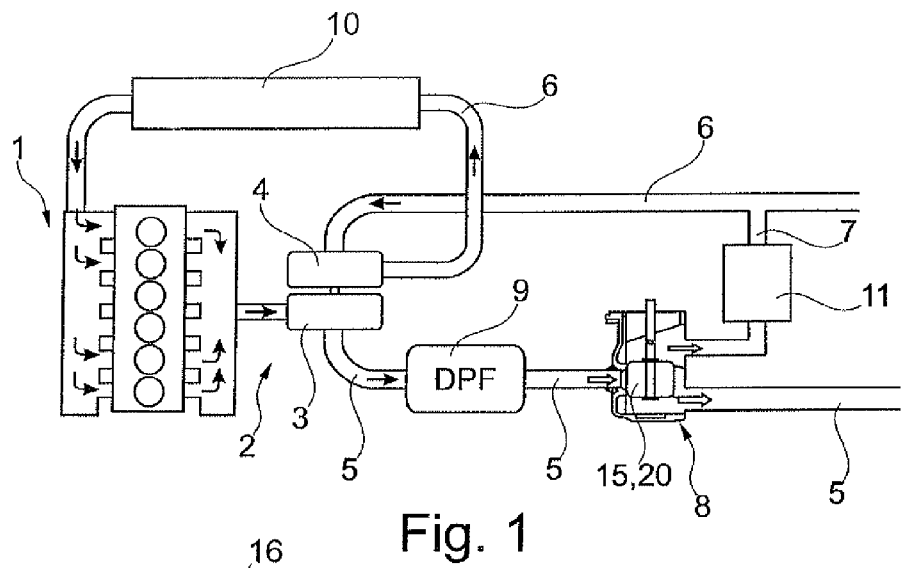
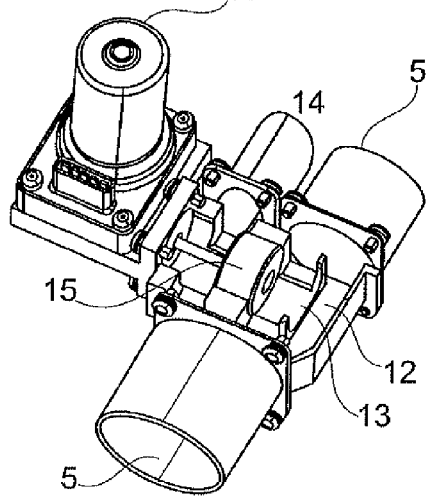
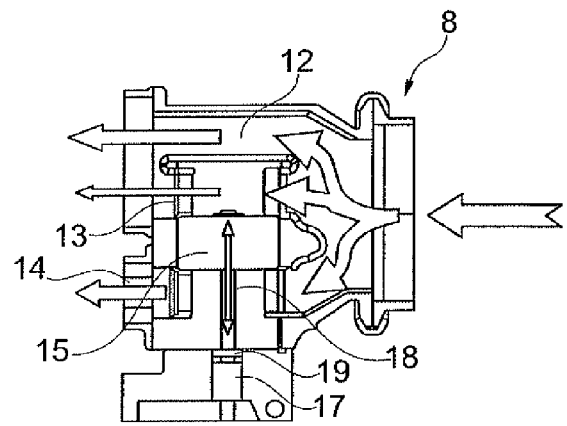
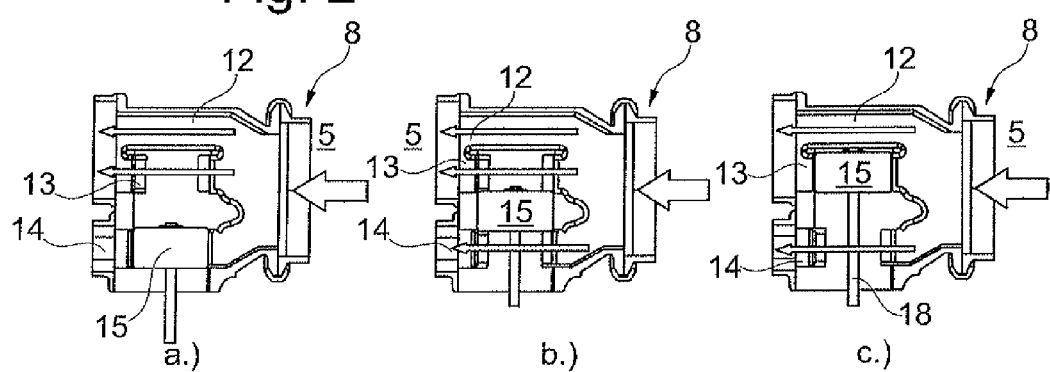
Fig. 1
Fig. 2
Fig. 3
Fig. 4

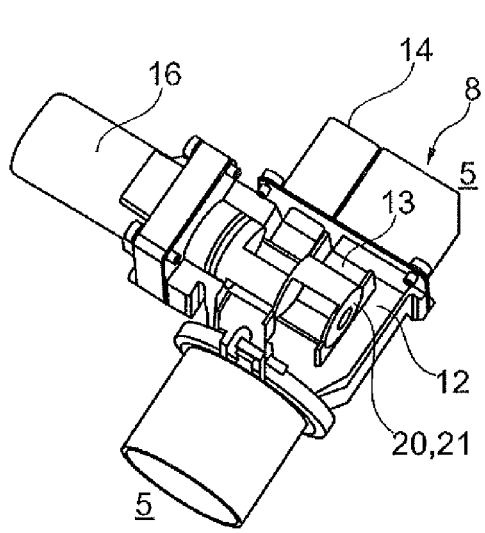
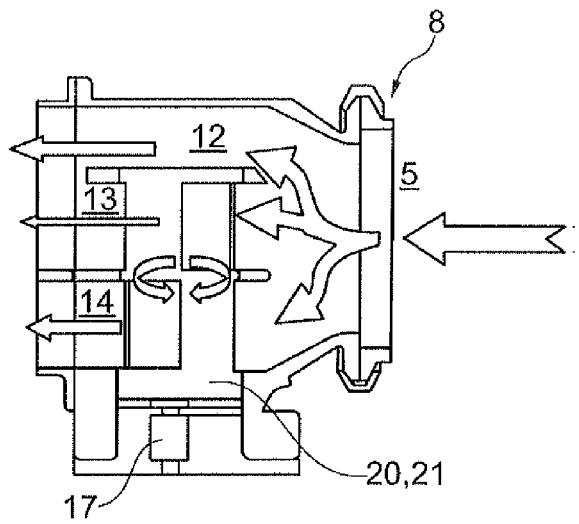
Fig. 5　　　　　　　　Fig. 6
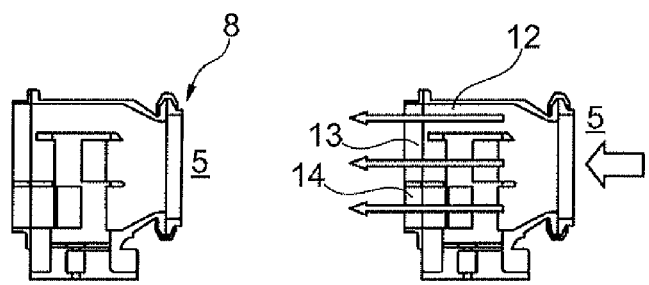
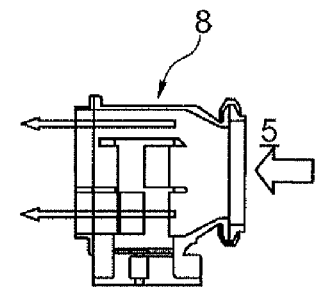
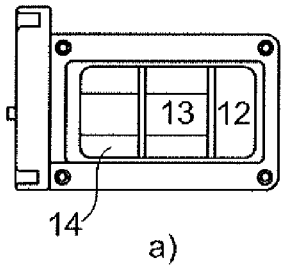
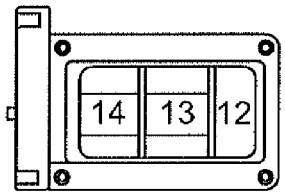
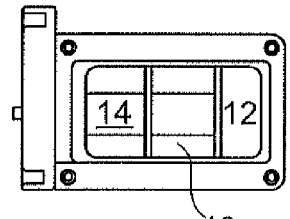
a)　　　　　　　b)　　　　　　　c)
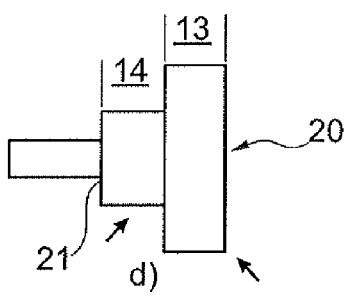
d)
Fig. 7

SUPERCHARGED INTERNAL COMBUSTION ENGINE

CROSS-REFERENCE TO RELATED APPLICATIONS

This application claims priority to International Application No. PCT/EP2012/064703, filed Jul. 26, 2012, German Patent Application No. 10 2011 080 101.4, filed Jul. 29, 2011, and German Patent Application No. 10 2011 080 965.1, filed Aug. 15, 2011, the contents of which are hereby incorporated in their entirety.

TECHNICAL FIELD

The invention relates to a supercharged internal combustion engine having an exhaust gas turbocharger, which is integrated into an exhaust section on the turbine side and into an intake section on the compressor side of the internal combustion engine, according to the introductory clause of claim 1.

BACKGROUND

From DE 10 2008 005 400 A1 a generic internal combustion engine having an exhaust gas turbocharger is known, wherein an exhaust gas recirculation line which connects the exhaust section and the intake section is provided. The exhaust gas recirculation line branches off here from the exhaust section of the internal combustion engine upstream of a turbine of the exhaust gas turbocharger and opens again into an intake section of the internal combustion engine downstream of the compressor of the exhaust gas turbocharger, so that in this case one speaks in terms of a high pressure exhaust gas recirculation. Here, an exhaust gas recirculation valve is arranged in the region of the exhaust gas recirculation line.

Generally in modern motor vehicles, an increased exhaust gas recirculation is to take place, in order to thereby be able to reduce the NOx threshold values, which form the basis for example of the Euro-6 standard. At the same time, in Otto engines a reduction of the fuel consumption can be achieved in the partial-load operational range. The lowering of the NOx emission values by a pure exhaust gas aftertreatment, for example by an SCR catalytic converter, has been found not to be sufficient here. A disadvantage in known high pressure exhaust gas recirculation systems, however, is the reduced exhaust gas mass flow which is available for the exhaust gas turbocharger, which results in a reduced compressor efficiency and a complex and hence expensive cooling of the recirculated exhaust gases, because these are usually taken almost directly from the internal combustion engine.

SUMMARY

The present invention is therefore concerned with the problem of overcoming the disadvantages which are known from the prior art.

This problem is solved according to the invention by the subject matter of the independent claim 1. Advantageous embodiments are the subject matter of the dependent claims.

The present invention is based on the general idea of no longer, as usual hitherto, branching off the exhaust gases, which are provided for recirculation, directly at an outlet of the internal combustion engine, but rather downstream of an exhaust gas turbocharger and thereby exclusively in a low pressure zone. For this, the supercharged internal combustion engine according to the invention has an exhaust gas turbocharger which is integrated into an exhaust section on the turbine side and into an intake section of the internal combustion engine on the compressor side. Furthermore, an exhaust gas recirculation line which connects the exhaust section and the intake section is provided, which branches off from the exhaust section downstream of the turbine of the exhaust gas turbocharger and opens into the intake section again upstream of the compressor. For performing open-loop or respectively closed-loop control of the exhaust gas recirculation rate, a valve device is provided here in the region of the exhaust gas recirculation line, for example in a branch-off region from the exhaust section. Through the valve device according to the invention, arranged in the region of the exhaust gas recirculation line, a throttle flap which was hitherto arranged in the exhaust section for performing open-loop/closed-loop control of the exhaust gas recirculation rate can be dispensed with. This is advantageous, because the throttle flap which was hitherto arranged in the exhaust section only permitted an inaccurate open-loop/closed-loop control of the exhaust gas recirculation rate compared with the valve device according to the invention. A further substantial disadvantage of the throttle flap which was arranged hitherto in the exhaust section is its susceptibility to contaminations which in the case of lengthy operation lead to inaccurate throttle functions. The contaminating of the throttle flap can take place for example by the particulate materials which are not removed in the diesel particle filter. In the valve device according to the invention, however, not only is the exhaust gas recirculation mass flow, but at the same time also an exhaust gas counter-pressure able to be controlled or respectively regulated here.

In an advantageous further development of the solution according to the invention, the valve device has a displaceable valve piston, which is displaceable in axial direction for performing open-loop/closed-loop control of the exhaust gas recirculation rate. This valve piston can be constructed for example from ceramic. Through the construction of the valve piston from ceramic, an extremely smooth surface can be achieved, which considerably impedes the accretions of dirt, in particular of soot particles. Such a piston can, in addition, have a self-cleaning effect, because on axial displacement into the different positions it is stripped off at a corresponding valve seat. In addition, a valve device which is constructed in such a manner has a comparatively small installation space and a small pressure loss when the valve device is opened, because in this state the piston is preferably drawn out entirely from the flow cross-section. With a piston of such a type, in addition, a highly accurate through-flow control can be achieved, which is not able to be presented in this accuracy with throttle flaps or disc valves which are known hitherto. With the valve device according to the invention, furthermore, a temperature-and mass flow control is possible. By the removing of the recirculated exhaust gas downstream of the exhaust gas turbocharger, it is also distinctly colder, whereby on a renewed feeding for combustion in the internal combustion engine a distinctly reduced cooling input has to be operated. A displacing of the piston or generally of the valve element can take place here for example by means of an electric motor, wherein of course it is additionally conceivable that the valve device according to the invention is cooled. In particular owing to the latter fact, for example, but also solely owing to the circumstance that the valve device according to the invention is arranged in a non-temperature-critical region of the exhaust section, plastic parts can also come into use here, for example for a housing of the valve device, which would not be able to be used in the case of a direct arrangement of the valve device, for example in the region of an exhaust manifold, owing to the high exhaust gas temperatures prevailing there.

Expediently, the valve piston is displaceable between at least three positions, namely a first position in which it closes a second exhaust gas duct, whereas the first exhaust gas duct and the exhaust gas recirculation duct are completely open, a second position in which it completely opens the first and second exhaust gas duct and the exhaust gas recirculation duct, and a third position in which it closes the exhaust gas recirculation duct, whereas the first and second exhaust gas duct are completely open. In the third position, therefore, no exhaust gas is recirculated, but rather all the exhaust gas is discharged via the exhaust gas duct. In the first position, on the other hand, a comparatively high exhaust gas recirculation rate is able to be achieved, because the entire exhaust gas stream is distributed exclusively onto the first exhaust gas duct and the exhaust gas recirculation duct. In the second position of the valve piston, however, only a reduced exhaust gas recirculation is able to be presented, because here the exhaust gas stream is distributed to both exhaust gas ducts and the exhaust gas recirculation duct. Of course, discretionary intermediate positions are also conceivable here for the exact and, in particular, fine adjustment of the exhaust gas recirculation rate. Additionally, influence can be exerted on the exhaust gas recirculation rate by a corresponding cross-section dimensioning of the first and second exhaust gas duct and of the exhaust gas recirculation duct.

Instead of the axially displaceable valve piston, a rotatable valve element can also be provided, for example in the manner of a cylinder or a flap, wherein this rotatable valve element can also be constructed for example from ceramic, so that also in this case undesirable accretions can be avoided or at least reduced and, at the same time a self-cleaning effect can be achieved by a stripping off on rotating of the rotatable valve element. Of course, a pivotable flap is also conceivable for performing open-loop/closed-loop control of the exhaust gas recirculation rate, wherein this can also be constructed or respectively coated by ceramic, so that here also a comparatively smooth surface is able to be achieved, on which deposits do not adhere or only adhere with difficulty.

Further important features and advantages of the invention will emerge from the subclaims, from the drawings and from the associated figure descriptions by means of the drawings.

It shall be understood that the features mentioned above and to be further explained below are able to be used not only in the respectively indicated combination, but also in other combinations or in isolation, without departing from the scope of the present invention.

Preferred example embodiments of the invention are represented in the drawings and are explained in further detail in the following description, wherein identical reference numbers refer to identical or similar or functionally identical components.

There are shown here, respectively diagrammatically.

BRIEF DESCRIPTION OF THE DRAWINGS

FIG. 1 an internal combustion engine according to the invention with an exhaust gas turbocharger and a valve device for performing open-loop/closed-loop control of an exhaust gas recirculation rate in the region of the branching off of an exhaust gas recirculation line from the exhaust section, FIG. 2 a possible first embodiment of the valve device with an axially displaceable piston, FIG. 3 a sectional representation through the valve device, FIG. 4a-c different switching states of the valve device shown according to FIGS. 2 and 3, FIG. 5 a further alternative embodiment of the valve device according to the invention with a rotatable valve element, FIG. 6 a sectional representation through the valve device, FIG. 7a-c the valve devices illustrated according to FIGS. 5 and 6, at different switching states, FIG. 7d a rotatable valve element with different radii in the region of the second exhaust gas duct and of the exhaust gas recirculation duct, FIG. 8 a further alternative embodiment of the valve device according to the invention with a pivotable flap, FIG. 9 a sectional representation through the valve device according to FIG. 8, FIG. 10a-c different switching states of the valve device shown according to FIGS. 8 and 9.

DETAILED DESCRIPTION

Figure 8:
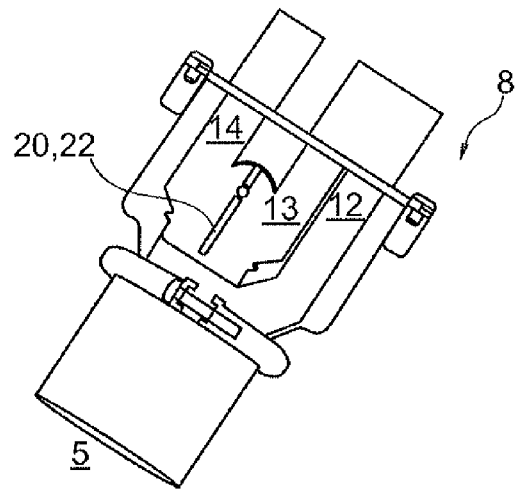

According to FIG. 1, a supercharged internal combustion engine 1 according to the invention has an exhaust gas turbocharger 2 with a turbine 3 and a compressor 4. The exhaust gas turbocharger 2 is integrated here into an exhaust section 5 on the turbine side and into an intake section 6 of the internal combustion engine 1 on the compressor side, wherein in addition an exhaust gas recirculation line 7 which connects the exhaust section 5 and the intake section 6 is provided. According to the invention, the exhaust gas recirculation line 7 branches off from the exhaust section 5 downstream of the turbine 3 of the exhaust gas turbocharger 2 and opens into the intake section 6 upstream of the compressor 4. In addition, a valve device 8 for performing open-loop/closed-loop control of an exhaust gas recirculation rate is arranged in the region of the exhaust gas recirculation line 7.

Through the arrangement of the exhaust gas recirculation line 7 downstream of the turbine 3 of the exhaust gas turbocharger 2, it is arranged in the low pressure zone, in which the exhaust gases usually have a distinctly lower temperature, so that they do not have to be cooled, or do not have to be cooled so intensively, before a renewed feeding into the internal combustion engine 1, as would be the case with a high pressure exhaust gas recirculation, i.e. with an exhaust gas recirculation upstream of the turbine 3. Generally, the exhaust gas recirculation fulfils the purpose here of reducing the NOx emissions discharged as a whole from the internal combustion engine 1, which would not be able to be presented sufficiently without the exhaust gas recirculation, i.e. exclusively with corresponding SCR- and NOx-storage catalytic converters. By the removal from the low pressure zone, i.e. downstream of the turbine 3 of the exhaust gas turbocharger 2, of the exhaust gases which are to be recirculated, the entire exhaust gas mass flow coming from the internal combustion engine 1 is still available to the turbine 3, so that it can generate a comparatively high compressor capability, which would not be the case with an exhaust gas removal upstream of the turbine 3. With the valve device 8 according to the invention, not only the exhaust gas recirculation rate, i.e. the exhaust gas recirculation mass flow, but also at the same time an exhaust gas counter-pressure can be regulated or respectively controlled, which hitherto had to be brought about by throttle flaps arranged in the exhaust section 5. Such throttle flaps, however, permit an only distinctly more inaccurate regulation/control compared with the valve device 8 according to the invention and in addition do not respond so quickly, as the valve device 8 according to the invention, because with a closing of the throttle flap arranged in the exhaust section 5 firstly a corresponding exhaust gas pressure must build up. However, it is particularly advantageous that the exhaust gases which are recirculated in the low pressure zone have a distinctly lower exhaust gas temperature and thereby require distinctly less cooling energy before a renewed feeding for the combustion in the internal combustion engine 1.

Between the turbine 3 of the exhaust gas turbocharger 2 and the valve device 8, furthermore a filter 9, for example a diesel particle filter, can be arranged, which reduces a contamination acting on the valve device 8. Between the compressor 4 and the internal combustion engine 1 in addition a charge-air cooler 10 can be arranged, which cools the charge air provided for combustion in the internal combustion engine 1 and thereby can feed more air for each combustion process. A corresponding device in the form of an exhaust gas cooler 11 can also be arranged between the valve device 8 and the intake section 6, in particular in the region of the exhaust gas recirculation line 7.

Figure 12:
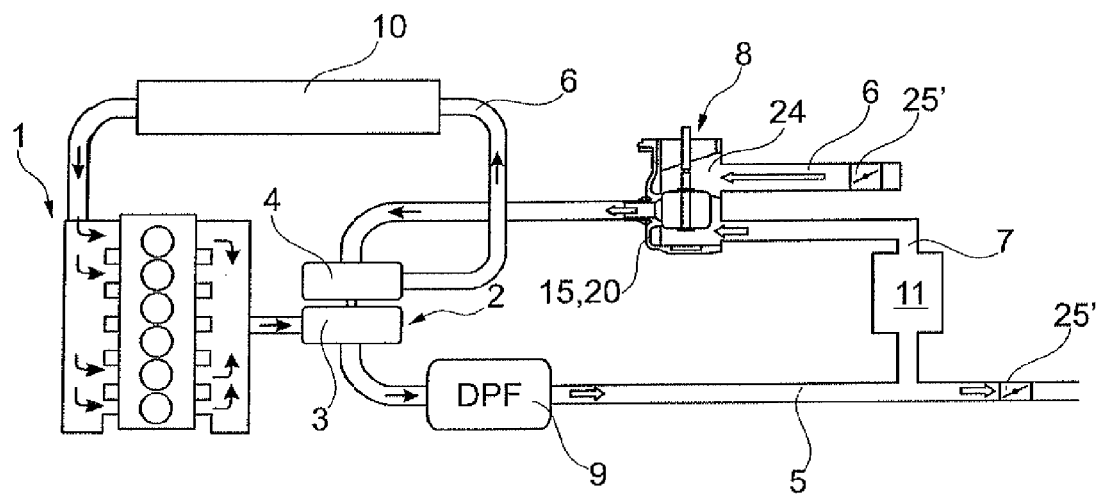

Generally, the valve device 8 can be arranged in the region of the branching of the exhaust gas recirculation line 7 off from the exhaust section 5 (cf. FIG. 1) or else in the region of the opening of the exhaust gas recirculation line 7 into the intake section 6 (cf. FIG. 12). Alternatively, it is also conceivable that the valve device 8 is arranged in the region of the filter 9 or in the region of the exhaust gas cooler 11, and in particular as an integral constituent part in these components.

It applies to the embodiments of the valve device 8 according to the invention which are described below that the exhaust section 5 is divided in the region of the valve device 8 into a first exhaust gas duct 12, a second exhaust gas duct 13 and an exhaust gas recirculation duct 14, wherein the exhaust gas recirculation duct 14 is connected in a communicating manner with the exhaust gas recirculation line 7. The valve device 8 is constructed here according to the position for the at least partial closing of the second exhaust gas duct 13 or of the exhaust gas recirculation duct 14, whereas the first exhaust gas duct 12 is not closed in any position, so that always an at least small exhaust gas stream is discharged toward the exterior via the first exhaust gas duct 12.

In FIGS. 2 to 4 a first possible embodiment of the valve device 8 according to the invention is represented, which in this case has a displaceable valve piston 15, which is displaceable in axial direction for performing open-loop/closed-loop control of the exhaust gas recirculation rate. This valve piston 15 can be constructed for example from ceramic and can thereby have a comparatively smooth surface, which at least makes difficult, preferably prevents, an adherence of undesirable deposits. Such a smooth valve piston 15 also has a cleaning effect, which is not to be underestimated, because it is stripped off on its outer surface during the displacement to and fro. Generally, the valve piston 15 is displaceable between at least three positions (cf. FIGS. 4*a*-*c*), namely a first position shown according to FIG. 4*c*, in which it closes the second exhaust gas duct 13, whereas the first exhaust gas duct 12 and the exhaust gas recirculation duct 14 are completely open. In this position, a comparatively high exhaust gas recirculation rate occurs, because the exhaust gas mass flow arriving from the exhaust section 5 is only divided to the first exhaust gas duct 12 and the exhaust gas recirculation duct 14. In a second position, which is illustrated according to FIG. 4*b*, the valve piston 15 opens both the first and second exhaust gas duct 12, 13 and also the exhaust gas recirculation duct 14, so that also in this position an exhaust gas recirculation takes place, but the exhaust gas recirculation rate lies below that of the first position. According to FIG. 4*a* finally, a third position is illustrated, in which the valve piston 15 closes the exhaust gas recirculation duct 14, whereas the first and second exhaust gas duct 12, 13 are completely open, so that in this case no exhaust gas recirculation takes place. In addition to the positions shown according to FIGS. 4*a* to 4*c*, of course intermediate positions are also conceivable for the particularly fine open-loop/closed-loop control of the exhaust gas recirculation rate, so that the valve piston 15 for example projects only partially into the exhaust gas recirculation duct 14 and thereby does not close it completely, but rather only partially.

FIG. 4*b* shows here the second position of the valve piston 15, in which the latter is situated for example without the current feed of a corresponding actuating drive 16, for example of an electric motor. The valve piston 15 is mounted here via a bearing 17 and is displaced by means of a piston rod 18. The bearing 17 is sealed here by means of a corresponding seal 19 with respect to the part of the valve device 8 which is directing the exhaust gas.

On observing the valve devices 8 according to FIGS. 5 to 7, it can be seen that the valve device 8 in the embodiments shown there has a rotatable valve element 20 in the manner of a valve cylinder 21, which likewise can of course be constructed from metal or from ceramic. In this case, also, the construction of the valve element 20 from ceramic has the great advantage of a smooth surface and thereby a reduced tendency to undesirable accretions. As in the valve device 8 according to FIGS. 2 to 4, the valve element 20 despite the influencing of a mass flow is constructed in the second exhaust gas duct 13 and in the exhaust gas recirculation duct 14.

According to FIGS. 7*a* to 7*c*, again the three extreme positions of the valve device 8 are shown here, wherein in the first position shown according to FIG. 7*c*, the valve element 20 closes the second exhaust gas duct 13, whereas the first exhaust gas duct 12 and the exhaust gas recirculation duct 14 are completely open. In the second position shown according to FIG. 7*b*, however, the valve element 20 opens all the ducts 12, 13 and 14 respectively completely. In the third position shown in FIG. 7*a*, however, the rotatable valve element 20 closes the exhaust gas recirculation duct 14, whereas the first and the second exhaust gas duct 12, 13 are completely open, so that in this case no exhaust gas recirculation takes place. According to FIG. 7*b*, a reduced exhaust gas recirculation takes place compared with FIG. 7*c*, whereas according to FIG. 7*c* the maximum possible exhaust gas recirculation takes place. As in the comments regarding the valve device 8 according to FIGS. 2 to 4, also in the valve device 8 according to FIGS. 5 to 7 the most varied of intermediate positions of the rotatable valve element 20 are conceivable, so that in addition to the extremal positions shown in FIGS. 7*a* to 7*c*, also discretionary intermediate positions are able to be presented for the exact dosing of the exhaust gas recirculation rate.

On observing FIGS. 7*a* to 7*c*, it can be seen in addition that the first exhaust gas duct 12 has a greater cross-section than, for example, the second exhaust gas duct 13 or the exhaust gas recirculation duct 14. In this way, the valve element 20 can of course also be constructed as is illustrated for example according to FIG. 7*d*, so that for example a diameter of the valve element 20, constructed as valve cylinder 21, is distinctly greater in the region of the second exhaust gas duct 13 than in the region of the exhaust gas recirculation duct 14.

Figure 9:
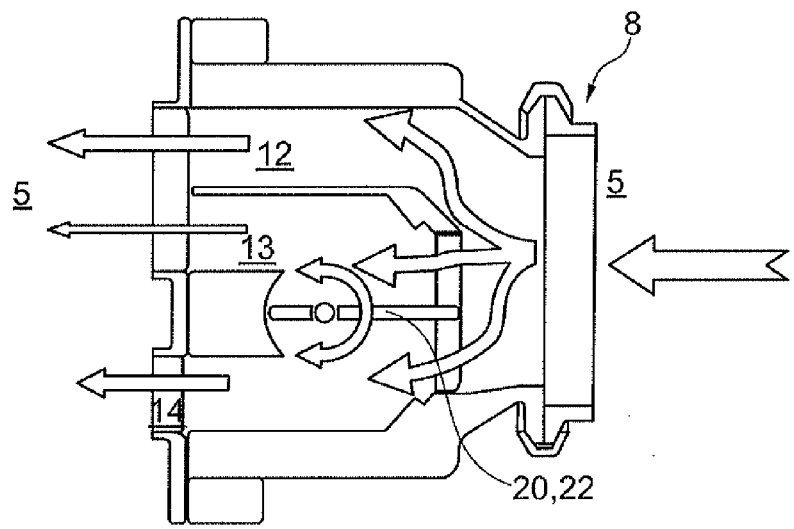
Figure 10:
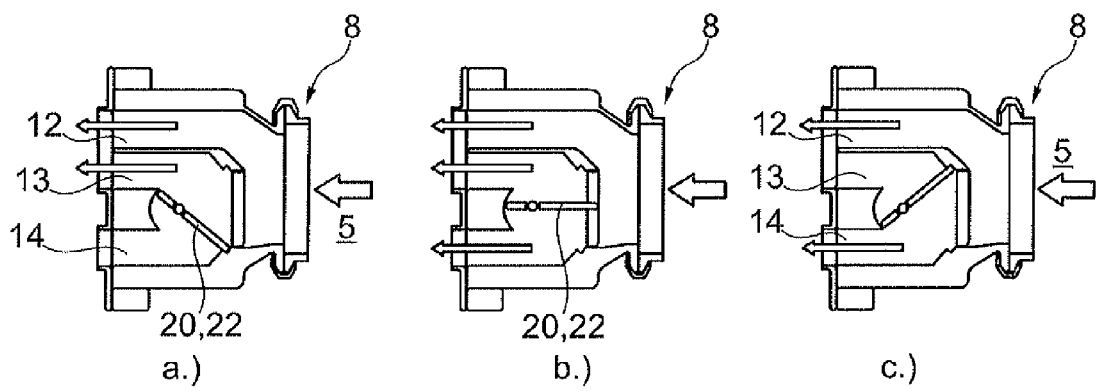

According to FIGS. 8 to 10, finally, a further alternative embodiment of the valve device 8 is shown, wherein in this case the valve element 20 is constructed as a flap 22. In the extremal position illustrated in FIG. 10c, which at the same time represents the first position, the valve element 20, i.e. the flap 22, closes the second exhaust gas duct 13, whereas the first exhaust gas duct 12 and the exhaust gas recirculation duct 14 are open. In the position illustrated according to FIG. 10b, however, all the ducts 12, 13 and 14 are open. In the third position illustrated in FIG. 10a, the valve element 20, i.e. the flap 22, closes the exhaust gas recirculation duct 14 completely, whereas the first and second exhaust gas duct 12, 13 are open. In this case, again, therefore no exhaust gas recirculation takes place.

Figure 11:
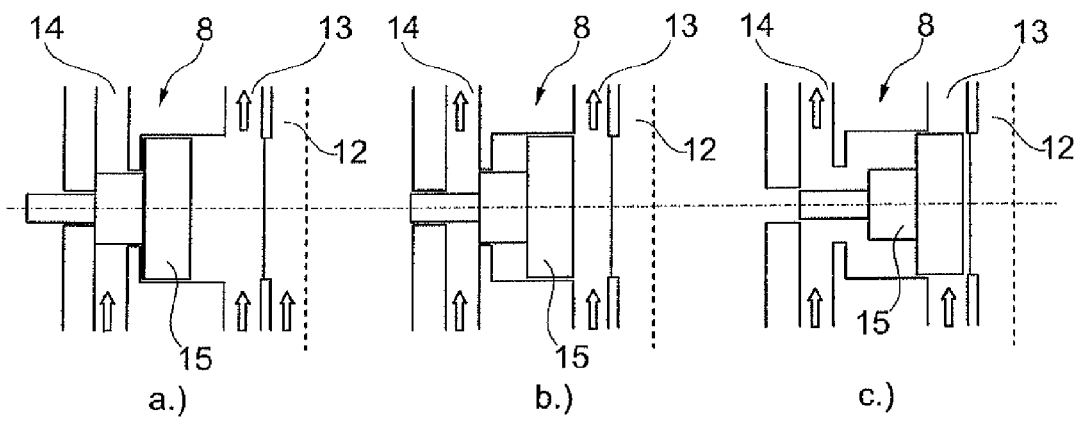
FIG. 11a-c different switching states of a valve device with an axially displaceable piston, which has different radii, FIG. 12 an internal combustion engine according to the invention with a valve device for performing open-loop/closed-loop control of an exhaust gas recirculation rate in the region of the opening of the exhaust gas recirculation line into the intake section, FIG. 13a-c different switching states of a valve device in the region of the opening of the exhaust gas recirculation line into the intake section.

In FIG. 11a to 11c a further possible embodiment of the valve device 8 is illustrated, which in this case has a displaceable valve piston 15 with different radii, which is displaceable for performing open-loop/closed-loop control of the exhaust gas recirculation rate in axial direction. This valve piston 15 can be constructed for example from ceramic and can thereby have a comparatively smooth surface which impedes, preferably prevents, an adherence of undesirable deposits. Generally, the valve piston 15 is displaceable between at least three positions (cf. FIGS. 11a-c), namely a first position shown according to FIG. 11c, in which it closes the second exhaust gas duct 13, whereas the first exhaust gas duct 12 and the exhaust gas recirculation duct 14 are completely open. In this position, a comparatively high exhaust gas recirculation rate occurs, because the exhaust gas mass flow arriving from the exhaust section 5 is only divided to the first exhaust gas duct 12 and the exhaust gas recirculation duct 14. In a second position, which is illustrated according to FIG. 11b, the valve piston 15 opens both the first and second exhaust gas duct 12, 13 and also the exhaust gas recirculation duct 14, so that also in this position an exhaust gas recirculation takes place, the exhaust gas recirculation rate, however, lies below that of the first position. According to FIG. 11a, finally, a third position is illustrated, in which the valve piston 15 closes the exhaust gas recirculation duct 14, whereas the first and second exhaust gas duct 12, 13 are completely open, so that in this case no exhaust gas recirculation takes place. In addition to the positions shown according to FIGS. 11a to 11c, of course also intermediate positions are conceivable for the particularly fine open-loop/closed-loop control of the exhaust gas recirculation rate, so that the valve piston 15 for example projects only partially into the exhaust gas recirculation duct 14 and thereby does not close this completely, but rather only partially.

The first exhaust gas duct 12 is drawn here according to FIG. 11a-c with a broken line, which is intended to mean that this is provided purely optionally. In this case, only the second exhaust gas duct 13 and the exhaust gas recirculation duct 14 would be present, which would both be completely closable by the valve piston 15. The second exhaust gas duct 13 has a distinctly greater cross-section than the exhaust gas recirculation duct 14, so that the valve piston 15 has a distinctly greater diameter in this region than in the region of the exhaust gas recirculation duct. The valve device 8 which is shown can of course also be arranged in the region of opening of the exhaust gas recirculation line 7 into the intake section 6, wherein in this case then in the first and second exhaust gas line 12, 13 no exhaust gas, but rather fresh air, would flow out from the intake section 6.

Figure 13:
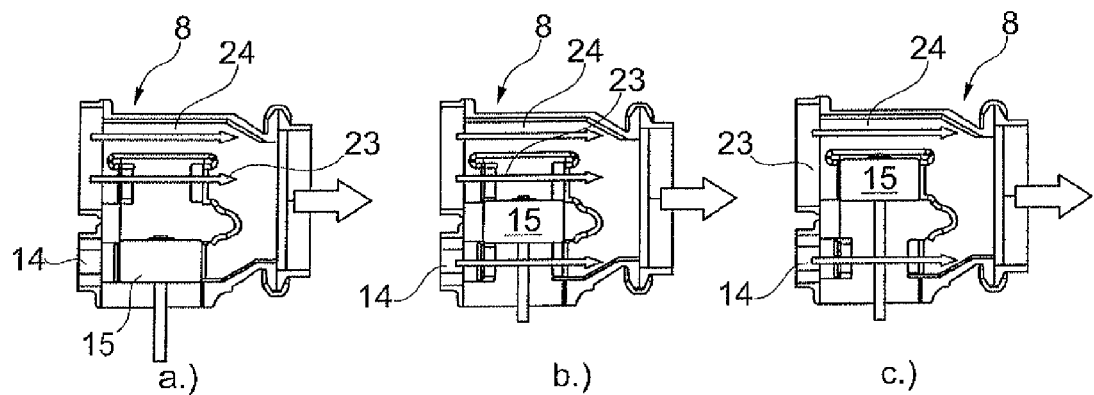

Such an arrangement of the valve device 8 is shown in FIG. 12 and FIG. 13. According to FIGS. 13a to 13c a valve device 8 is illustrated in the region of the opening of the exhaust gas recirculation line 7 in the intake section 6, again having a displaceable valve piston 15 which is displaceable in axial direction for performing open-loop/closed-loop control of the exhaust gas recirculation rate. Generally, the valve piston 15 is displaceable between at least three positions (cf. FIGS. 13a-c), namely a first position shown according to FIG. 13c, in which it closes a second fresh air duct 23, whereas the first fresh air duct 24 and the exhaust gas recirculation duct 14 are completely open. In this position, a comparatively high exhaust gas recirculation rate occurs. In a second position, which is illustrated according to FIG. 13b, the valve piston 15 opens both the first and second fresh air duct 24, 23 and also the exhaust gas recirculation duct 14, so that also in this position an exhaust gas recirculation occurs, however the exhaust gas recirculation rate lies below that of the first position. According to FIG. 13a finally, a third position is illustrated, in which the valve piston 15 closes the exhaust gas recirculation duct 14, whereas the first and second fresh air duct 24, 23 are completely open, so that in this case no exhaust gas recirculation occurs. In addition to the extremal positions which are shown, of course also again intermediate positions are conceivable for the particularly fine open-loop/closed-loop control of the exhaust gas recirculation rate.

In the arrangement of the valve device 8 in the region of the opening of the exhaust gas recirculation line 7 into the intake section 6, this has a new function, i.e. the valve device 8 controls and regulates not only the exhaust gas recirculation mass flow, but also the intake pressure in the intake section 6. With a provision of a throttle flap 25, 25' in the intake section 6 and/or in the exhaust section 5, in addition influence can be exerted on the recirculatable exhaust gas quantity. However, with the valve device 8 according to the invention, generally such throttle flaps can also be dispensed with.

By the whole variety of embodiments of the valve device 8 according to the invention, a particularly exact open-loop/closed-loop control of the exhaust gas recirculation rate in the low pressure region, i.e. downstream of the turbine 3 of the exhaust gas turbocharger 2 is possible, which was not thus possible with previous throttle flaps arranged in the exhaust section 5. At the same time, a temperature control is also possible. All of the shown embodiments of the valve device 8 have a small installation space requirement, which likewise presents a great advantage. In particular, the valve devices 8 according to FIGS. 2 to 7 in addition generate a small pressure loss here, because with an open second exhaust gas duct 13 or respectively an open exhaust gas recirculation duct 14, the respective valve element 20, 21, 22 or respectively the valve piston 15 does not project into a flow cross-section. Through the construction from ceramic, in addition undesirable deposits are reduced by the extremely smooth surface.

The invention claimed is:

1. A supercharged internal combustion engine, comprising:
   an exhaust gas turbocharger which is integrated into an exhaust section on a turbine side and into an intake section on a compressor side, and an exhaust gas recirculation line connecting the exhaust section and the intake section;
   wherein the exhaust gas recirculation line branches off from the exhaust section downstream of a turbine of the exhaust gas turbocharger and opens into the intake section upstream of a compressor; and
   a valve device for performing at least one of open-loop and closed-loop control of an exhaust gas recirculation rate arranged in a region of the exhaust gas recirculation line;

wherein the valve device divides the exhaust section into a first exhaust gas duct, a second exhaust gas duct distinct from the first exhaust gas duct and an exhaust gas recirculation duct, the exhaust gas recirculation duct fluidly connected to the exhaust gas recirculation line, and wherein the valve device is configured to close at least one of the second exhaust gas duct and the exhaust gas recirculation duct;

wherein the valve device includes a displaceable valve piston, the valve piston being displaceable in an axial direction along a reciprocating axis for performing at least one of open-loop control and closed-loop control of the exhaust gas recirculation rate; and wherein the valve piston includes two sections each having a different radii from one another, and wherein one section of the valve piston is configured to close the exhaust gas recirculation duct and the other section of the valve piston is configured to close the second exhaust gas duct.

2. The internal combustion engine according to claim 1, wherein at least one of between the turbine of the exhaust gas turbocharger and the exhaust gas recirculation line a filter is arranged, between the compressor and the internal combustion engine a charge-air cooler is arranged, and an exhaust gas cooler is arranged in the exhaust gas recirculation line.

3. The internal combustion engine according to claim 2, wherein at least one of the valve device is arranged at the branching off of the exhaust gas recirculation line from the exhaust section, the valve device is arranged at the opening of the exhaust gas recirculation line into the intake section, the valve device is arranged between the filter and the exhaust gas recirculation line, and the valve device is arranged between the charge-air cooler and the exhaust gas recirculation line.

4. The internal combustion engine according to claim 1, wherein the valve piston is displaceable at least between three positions, the three positions including:

a first position, in which the valve piston closes the second exhaust gas duct, wherein the first exhaust gas duct and the exhaust gas recirculation duct are open, a second position, in which the valve piston opens the first exhaust gas duct, the second exhaust gas duct and the exhaust gas recirculation duct, and a third position, in which the valve piston closes the exhaust gas recirculation duct, wherein the first exhaust gas duct and the second exhaust gas duct are open.

5. The internal combustion engine according to claim 1, wherein the valve device couples to the exhaust section via a common opening upstream of the first exhaust gas duct, the second exhaust gas duct and the exhaust gas recirculation duct, and wherein the axial direction along the reciprocating axis of the displaceable valve piston extends transversely to a through-flow direction of a fluid in the valve device.

6. The internal combustion engine according to claim 5, wherein the valve piston is displaceable at least between three positions, the three pistons including:

a first position, in which the valve piston closes the second exhaust gas duct, whereas the first exhaust gas duct and the exhaust gas recirculation duct are completely open, a second position, in which the valve piston completely opens the first exhaust gas duct, the second exhaust gas duct and the exhaust gas recirculation duct, and a third position, in which the valve piston closes the exhaust gas recirculation duct, whereas the first exhaust gas duct and the second exhaust gas duct are completely open.

7. The internal combustion element according to claim 6, wherein the valve piston is operatively coupled to an actuating drive for axially displacing the valve piston;

wherein the exhaust gas recirculation duct, the second exhaust gas duct and the first exhaust gas duct are arranged successively along the axial direction; and wherein the first exhaust gas duct is disposed distally to the actuating drive in relation to the exhaust gas recirculation duct, and the second exhaust gas duct is disposed between the first exhaust gas duct and the exhaust gas recirculation duct in the axial direction.

8. The internal combustion engine according to claim 1, wherein the valve piston includes a ceramic material.

9. The internal combustion engine according to claim 4, wherein at least one of:

a respective flow cross-section of the first exhaust gas duct and the exhaust gas recirculation duct are unobstructed by the valve piston in the first position;

a respective flow cross-section of first exhaust gas duct, the second exhaust gas duct and the exhaust gas recirculation duct are unobstructed by the valve piston in the second position; and a respective flow cross-section of the first exhaust gas duct and the second exhaust gas duct are unobstructed by the valve piston in the third position.

10. The internal combustion engine according to claim 4, wherein the valve device further includes a valve seat for accommodating the valve piston arranged at each of the first position, the second position and the third position.

11. The internal combustion engine according to claim 4, wherein the exhaust gas recirculation rate is greater in the first position of the valve piston than in the second position of the valve piston.

* * * * *